United States Patent [19]

Bruder

[11] Patent Number: 4,477,544
[45] Date of Patent: Oct. 16, 1984

[54] INTERCELL CONNECTOR FOR LITHIUM BATTERIES

[75] Inventor: Alan H. Bruder, Burlington, Mass.

[73] Assignee: Polaroid Corporation, Cambridge, Mass.

[21] Appl. No.: 539,644

[22] Filed: Oct. 6, 1983

Related U.S. Application Data

[62] Division of Ser. No. 341,196, Jan. 20, 1982, Pat. No. 4,429,026.

[51] Int. Cl.³ ............................................. H01M 2/20
[52] U.S. Cl. .................................... 429/160; 429/162
[58] Field of Search ............... 429/160, 152, 149, 162, 429/130

[56] References Cited

U.S. PATENT DOCUMENTS

| | | | |
|---|---|---|---|
| 3,853,627 | 12/1974 | Lehmann et al. | 429/144 |
| 4,086,400 | 4/1978 | Hyland et al. | 429/122 |
| 4,105,831 | 8/1978 | Plasse | 429/86 |
| 4,119,770 | 10/1978 | Land | 429/152 |
| 4,204,036 | 5/1980 | Cohen | 429/152 |
| 4,287,276 | 9/1981 | Lundquist, Jr. | 429/206 |
| 4,292,380 | 9/1981 | O'Boyle et al. | 429/101 |

*Primary Examiner*—Anthony Skapars
*Attorney, Agent, or Firm*—Gaetano D. Maccarone

[57] ABSTRACT

Laminar batteries of series connected cells comprising lithium anodes and an electrolyte containing a passivating solvent reactive with lithium in which the cells are electrically connected in series by intercell barriers comprising outer layers of electrochemically inert electronically conducting material in contact with the electrochemically active anode and cathode of adjacent cells and a layer of metal foil between the electrochemically inert layers.

1 Claim, 8 Drawing Figures

INTERCELL CONNECTOR FOR LITHIUM BATTERIES

The is a division of application Ser. No. 341,196, filed Jan. 20, 1982, now U.S. Pat. No. 4,429,026.

This invention relates to electrical batteries, and particularly to a novel integral multicell lithium battery.

Lithium batteries have been long known to have potentially superior qualities, such as tolerance for low temperature, high energy density, and long shelf life, but have hitherto been adopted for use only in limited quantities and for highly specialized applications. As pointed out in an article entitled "Focus On Lithium Batteries: High Energy For Critical Needs", *Electronic Design*, Dec. 10, 1981, pgs. 183–198, at page 183, the reasons for this limited acceptance have been simple, but compelling; conventional lithium batteries are very expensive, and have a reputation for being dangerous.

The conventional approach to the design and construction of lithium batteries revolves about a conception of the battery as a single cell encapsulated in a metal container, as of nickel plated steel, and comprising a lithium disc formed integral with a grid of nickel plated steel, or stainless steel, as a current collector. The cathode is a solid pressed pellet of any of various reductants held in a metal cup, as by a metal ring. Such a construction is described, for example, in U.S. Pat. No. 3,853,627. This arrangement has manifest advantages in protecting the cell from mechanical damage; in preventing interactions between potentially reactive components of the atmosphere, such as $O_2$, $N_2$, $CO_2$, $H_2$ and $H_2O$, and the chemically active cell components; and in ameliorating to some degree the consequences of pressure generated within the cell, either by volatile electrochemical constituents such as $SO_2$, or by gases formed in secondary reactions between cell components and contaminants that are formed during storage or are not adequately excluded or removed during cell manufacture. However, the provisions made in this way to ensure cell integrity have significant attendant disadvantages; notable among these are the complexity and consequent cost of the construction, and the potential for explosion caused by excessive internal gassing, internal contaminants, misuse or improper disposal techniques. The potential for explosion is inherent in the use of the rigid metal cell container; i.e., in the very expedient adopted to minimize the probability of potentially explosive reactions.

Another disadvantage of the use of the single cell, metal container construction, not unique to the lithium battery but particularly onerous where the potentially high energy density of lithium systems is most attractive, is that multiple cell batteries require substantial external structure to provide low impedance intercell contacts. Such structure may involve soldered intercell connections, spring-loaded mounting and housing structure, or both.

The objects of this invention are to simplify the construction and improve the reliability of multicell lithium batteries, without increasing the weight of such batteries, or of the volume required to contain them.

Briefly, the above and other objects of the invention are attained by the adoption of a novel multicell construction in which the conventional rigid metal container of each cell, and the relatively complex mechanical construction of the cell components, are discarded in favor of an integrated laminar multicell package, of thin, flat construction, which would be incapable of supporting any really severe internal pressures that might lead to explosion upon misuse, misadventure or undesired internal reactions. In attempting to implement this radically different approach to the construction of a lithium battery, it was discovered that not only the basic tenets of conventional lithium battery design, but also the fundamental principles on which other multicell laminar batteries have been perfected, would have to be discarded.

As to the latter, integrally packaged multicell batteries are not broadly new, but have been highly developed in the form of series connected Leclanche cells, as described, for example, in U.S. Pat. Nos. 4,105,831 and 4,119,770. Such batteries, incorporating aqueous electrolyte systems, must be constructed in such a way that a carefully balanced exchange of gases between the cell components and the environment takes place during storage and use, to avoid drastic increases in internal impedance. In particular, it is necessary to provide for the escape of hydrogen generated at varying rates during storage and discharge of Leclanche cells, without allowing the escape of too much water from the cells, or the ingress of too much oxygen. In their most successful form, integral multicell laminar batteries of this kind are terminated at the ends by gas and liquid impermeable metal barriers, with the cells being separated by electronically conducting, electrochemically inert barriers of conductive plastic serving as intercell connectors. In, or adjacent, one cell of the battery, a vent structure, such as that described in U.S. Pat. No. 4,105,831, is incorporated to facilitate the escape of hydrogen while impeding the passage of oxygen and water. This structure is operative because the conductive plastic intercell connector, while substantially preventing the passage of anions and cations of the electrolyte, do not prevent the exchange of gases such as $O_2$, $N_2$, $H_2$ or $H_2O$ between the cells.

In lithium batteries, the basic problem is to exclude water from the nominally anhydrous cell, whence the development of the single cell battery with its rigid metal container, and extensive efforts to preclude internal gassing by appropriate choice of chemical components and rigid control during manufacture.

An extremely important component of the lithium cell, both from the standpoint of electrical performance and from the positive or negative impact on the internal gassing problem, is the organic solvent chosen for the electrolyte. The solvent should be one in which the chosen electrolyte is relatively soluble and exhibits high ionic activity in solution, and which also reacts to form a passivating film on the lithium anode to inhibit gassing. The most popular solvents for this purpose include propylene carbonate, which has both of the desired properties. The passivating effect of this or similar solvents is not fully understood, but is apparently no substantial barrier to ionization of the lithium anode during discharge, although effective to inhibit hydrogen generation upon storage.

In my copending U.S. applications Ser. Nos. 341,195 and 340,990, filed concurrently herewith for Lithium Batteries With Organic Slurry Cathodes, and Hermetically Sealed Lithium Batteries, respectively, and assigned to the assignee of this invention, I have described lithium batteries constructions and processes with which hermetically sealed lithium cells can be made that do not require pressurized containers to prevent disruption by internal gassing, and which do not require any mechanism for exchanging gases with the environment. In accordance with this invention, it has been found that these structures and processes can be utilized to make integrated laminar multicell lithium batteries, with the aid of structures and practices similar to those followed in the construction of integrated laminar multicell Leclanche batteries, but with two notable differences. First, the vent mechanism, whether by gas transport through gas permeable seals, or through specifically selective gas transport means such as those described in U.S. Pat. No. 4,105,831, must be omitted. This modification both prevents the loss of volatile electrolyte solvent components, and prevents the highly undesirable ingress of $N_2$, $O_2$, $CO_2$ and $H_2O$ from the environment. Second, a different kind of isolation between adjacent cells must be afforded than that provided by the conductive plastic intercell connectors used in conventional laminar constructions. In particular, a barrier impermeable to the passivating organic solvent used as a vehicle for the electrolyte must be provided between each cell. In practice, this barrier preferably takes the form of a thin sheet of metal, such as aluminum, covered on both sides with an electrochemically isolating layer of conductive plastic to prevent interaction between the anode and cathode of adjacent cells and the metal barrier. Since such a barrier inherently acts as an effective gas barrier as well as to block the passage of organic solvent, it will effectively prohibit the gas transport from cell to cell that is required for the proper operation of a multicell Leclanche battery having a vent mechanism in only one cell. However, this is an advantage in a lithium battery in accordance with the invention.

The reason for needing an intercell solvent barrier in a multicell lithium battery is not entirely free from doubt. However, it has been found that multicell lithium batteries constructed with conventional gas permeable intercell connectors of conductive plastic typically exhibit very high internal impedances shortly after electrochemical assembly. It is speculated that the cause for this impedance is degree of penetration of the conductive plastic by the passivating solvent, such as propylene carbonate, in one cell, sufficient to form an insulating film on the side of the lithium anode in the next adjacent cell opposite the electrolyte in the next adjacent cell. Such a film, if formed, would appear to inhibit electronic conduction even though the probably similar film formed on the electrochemically active other side of the anode does not impede ionization. Whatever the explanation, however, an effective intercell solvent barrier has been found essential to the manufacture of laminar multicell lithium batteries with long shelf lives and low impedance.

The practice of the invention will best be understood in the light of the following description, together with the accompanying drawings, of various illustrative embodiments thereof.

Lithium anode assemblies for use in multicell batteries in accordance with the invention may be of any conventional construction. However, presently preferred practice is to laminate a sheet of lithium directly to a suitable conductive plastic substrate in a controlled environment, after first providing a freshly exposed lithium substrate at least on the surface of the lithium sheet to which the conductive plastic substrate is to be adhered. This construction, and its advantages, are described in my copending U.S. application for Letters Patent Ser. No. 341,197 filed concurrently herewith for Lithium Batteries With Laminar Anodes and assigned to the assignee of this invention.

The exposure of a fresh lithium surface has been successfully accomplished by scraping the surface of commercially available lithium foil with a razor blade in an argon atmosphere, to remove at least substantial portions of a normal external coating believed to consist primarily of $Li_2O$, $Li_2O.CO_2$, and/or $Li_2CO_3$. For the preparation of commercially significant quantities of lithium anode laminate, it is proposed to provide the desired freshly exposed lithium surface by extrusion of a thin lithium foil, in the manner illustrated in FIG. 1.

Figure 1:
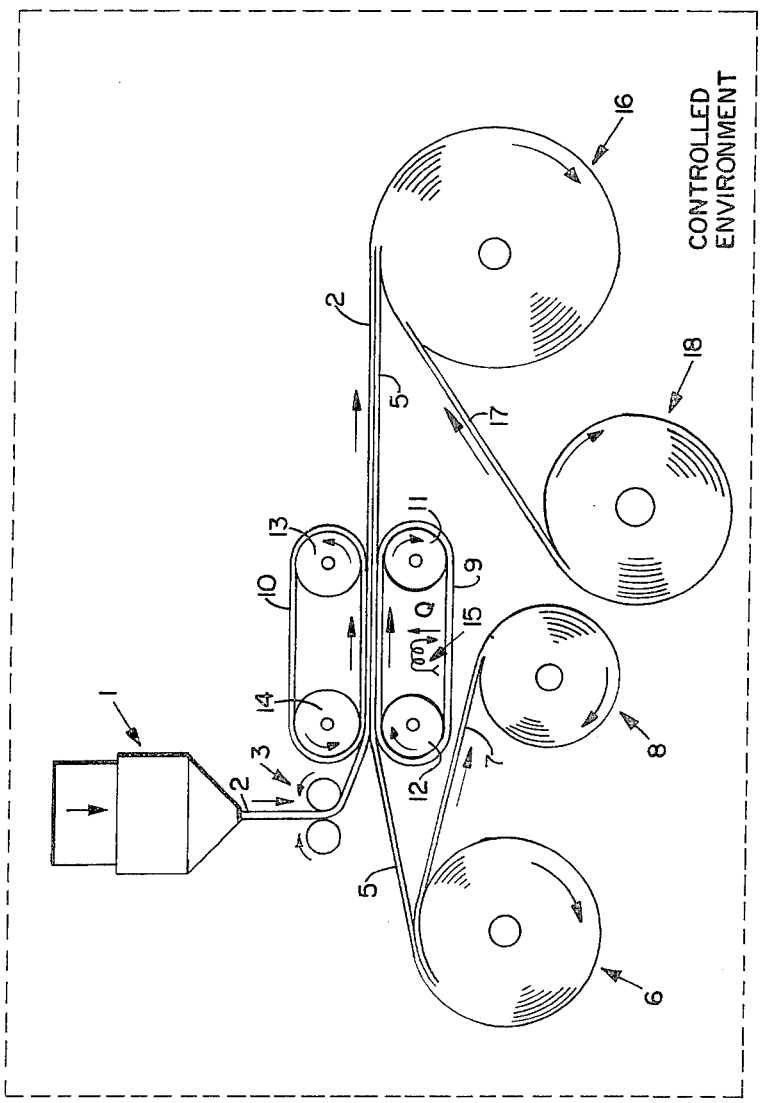
FIG. 1 is a schematic elevational sketch illustrating the manufacture of a laminate of lithium and conductive plastic useful in constructing multicell batteries in accordance with the invention.

Referring to FIG. 1, a billet or ingot of lithium is placed in an hydraulic ram extruder generally designated 1, and there forced through a suitable die, or series of dies, to form an emergent sheet or ribbon 2 of lithium of from 5 to 10 mils (about 0.1 to 0.3 mm) in thickness, and having freshly exposed lithium surfaces. The contaminating surface films to be expected on the original ingot will have been removed, or greatly diluted, in the extrusion process, by reason of the greatly increased surface to volume ratio of the extruded foil 2. If desired, the thickness of the foil 2 may be further reduced, as by driven rolls schematically indicated at 3, to a desired final thickness of from 1 to 3 mils (about 0.02 to 0.08 mm).

The extrusion process, together with any subsequent thickness reducing processes and all further steps in the preparation of batteries in accordance with the invention prior to sealing of the batteries, should be carried out in a controlled environment schematically suggested at 4 in FIG. 1. This environment can be an inert gas, such as argon, but in practice will preferably be dry air at a relative humidity of from 1 to 2 percent. The freshly exposed surfaces of the lithium sheet 2 will oxidize in time, even in this environment; thus, it is desirable to carry out the lamination process to be described concurrently with the production of the extruded lithium, rather than, for example, storing the extruded lithium for subsequent lamination.

The extrusion process carried out in the hydraulic extruder 1 is preferably carried out well below the melting point of lithium (180.5° C.), and preferably at about 40° C. (104° F.). The extruder can be kept at constant temperature in the vicinity of this desired operating temperature, as by the circulation of warm water in a suitable heat exchanger formed integral with the extruder housing. At 40° C., the operating pressures in the extruder are expected to be in the vicinity of 2000 p.s.i.

Following the extrusion process and any subsequent further thickness reducing operations, the lithium foil 2 is laminated directly to a sheet of conductive plastic 5. The conductive plastic 5 should be selected from those materials which can be activated thermally to an adhesive state well below the melting point of lithium, which do not contain species reactive with lithium, which can be prepared in the form of a relatively thin web (e.g., from 2 to 10 mils in thickness) without an appreciable population of pinholes, which are relatively resistant to the passage of gases such as $N_2$, $O_2$, $CO_2$, $H_2O$ and the like, which possess a relatively low electrical resistivity for current flow across the web in the neighborhood of 1 to 10 ohm centimeters, and which will adhere to metallic lithium with an adequate peel strength of, say, about 0.5 to 2 pounds per inch as measured by an Instron Tester without the aid of a reactive metal adhesive adjunct. A presently preferred material for this purpose is prepared in film form by extrusion of poly(ethylene/vinyl acetate) containing from 15 to 22 percent by weight, and preferably 22 percent by weight, of a high surface carbon black such as Ketjenblack EC, a carbon black produced by AKZO Chemie of the Netherlands. This material can be laminated to metallic lithium in a hot platen press, at a temperature of about 270° F. with an effective dwell time of at least three and preferably not more than nine seconds under moderate pressure sufficient to maintain the webs in intimate contact.

As indicated in FIG. 1, in a production process it is contemplated that the conductive plastic web 5 will be taken from a suitable supply roll 6, on the arbor of which it is wound together with a suitable conventional anti-blocking release sheet 7 of paper, polyester, or the like. The release sheet 7 is taken up on a roll 8 for reuse or disposal.

The lithium web 2 and the conductive plastic web 5 are laminated together by passage through laminating belts 9 and 10, of a material suitable for contact with lithium, such as glass fibers in a polytetrafluoroethylene matrix or the like. The belt 9 is carried on a driven roll 11 and an idler roll 12, and the belt 10 is similarly carried on a driven roll 13 and an idler roll 14. The rolls 11, 12, 13 and 14 are conventionally mounted to cause the belts 9 and 10 to exert pressure on the intermediate webs 2 and 5 to maintain them in intimate contact during the lamination process. Conventional means suggested at 15 are provided to supply heat Q to the belts to maintain the belt 9 at the highest temperature, which may be at or slightly above the melting point of lithium, and the belt 10 at a temperature well below the melting point of lithium, so that the temperature of the lithium component of the laminate will not rise to a level more than 10 to 20° C. below its melting point during the laminating process.

Following the laminating process, the laminate 2,5 may be cooled in any conventional manner, and then either slit and cut immediately for assembly into batteries in a manner to be described, or taken up on a roll 16 together with a release sheet 17 of paper, polyester or the like from a supply roll 18, for storage and later use.

FIGS. 2-7 illustrate the assembly of a single cell battery. The preparation of a multicell battery, to be described below in connection with FIG. 8, may procedein the same way except as to be noted.

While not necessary to the practice of the invention, it is convenient to assemble the battery on an insulating base sheet 20 (FIGS. 2 and 7), of kraft paper or the like, or most preferably of the material more fully shown and described in U.S. Pat. No. 4,086,400, the latter comprising a laminate of kraft paper, a thermoplastic liquid-impervious resin overlying the paper, and an overlayer on the resin of a heat sealing adhesive 21.

Figure 2:
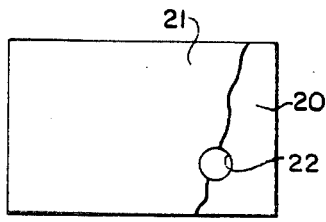
FIG. 2 is a schematic plan sketch, with parts broken away, of a nonconductive laminate useful in the preparation of multicell batteries in accordance with the invention.
Figure 7:
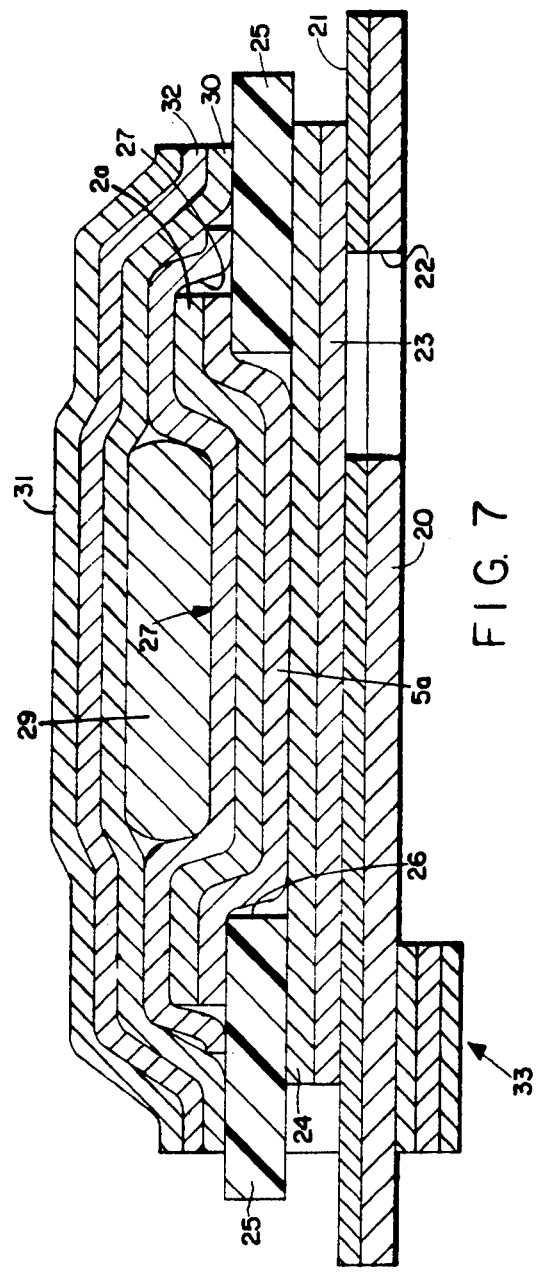
FIG. 7 is a cross-sectional view, on an enlarged scale, showing a completed cell assembled in the manner illustrated in FIGS. 2-5, as seen essentially along the lines 7-7 in FIG. 6.

As shown in FIGS. 2 and 7, the insulating sheet 20 is provided with an aperture 22 to expose the negative terminal of the battery comprising a sheet 23 of metal, preferably a sheet of aluminum foil, for example, of 2 mils in thickness.

The metal terminal sheet 23 is laminated to a selected region surrounding the aperture 22 in the insulating sheet 20, and to the peripheral borders of the sheet 20, but is not necessarily, and preferably is not, laminated to the insulating sheet in other regions.

Figure 3:
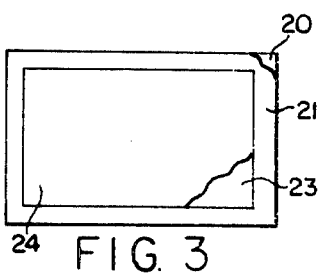
FIG. 3 is a schematic plan sketch similar to FIG. 2, showing additional laminae placed over the laminate of FIG. 2 in the course of assembly of a single cell battery, shown to simplify certain aspects of the construction of multicell batteries in accordance with the invention.

As shown in FIGS. 3 and 7, the upper side of the metal terminal sheet 23 is preferably coated with a thin layer of conductive priming adhesive 24, typically from 0.1 to 0.8 mils in thickness. Any suitable conductive plastic adhesive adherent to the metal and to the conductive plastic 5 of the anode laminate 2,5 can be employed for this purpose, the most suitable being a composition which is essentially the same as that of the web 5, but which contains a thermoplastic constituent containing reactive groups such as amine, carboxyl, hydroxyl or the like in place of a portion of the ethylene/vinyl acetate constituent of the web 5. One composition found suitable for this purpose is 70 parts by weight of Cabot XC-72 carbon black dispersed in 100 parts by weight of Vitel VPE-307, a polyester resin made and sold by Goodyear Tire and Rubber Co. of Akron, Ohio. This composition is prepared by dissolving the resin in a suitable solvent, such as 80 percent methyl ethyl ketone and 20 percent ethyl acetate, by weight based on the weight of solvent, and dispersing the carbon black in the solution, using sufficient solvent to make a coatable dispersion. This composition is coated on the aluminum, and heated to remove the solvent.

Figure 4:
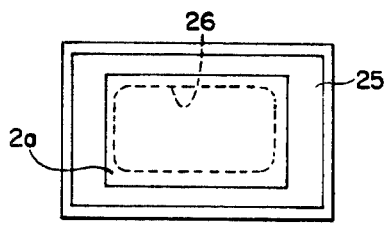
FIG. 4 is a schematic plan sketch similar to FIGS. 2 and 3, showing a cell comprising the components of FIGS. 2 and 3 with the addition of other components.

To the conductive adhesive surface 24 on the aluminum sheet 23 is adhered an insulating frame 25 as seen in FIGS. 4 and 7. The frame 25 is formed with a central aperture 26 which serves to receive other electrochemically active components in a manner to be described.

The frame 25 may be of any suitable conventional electricall insulating material that is inert to the constituents of the cell. One material that has been successfully employed is a 5 mil vinyl, specifically a poly(vinyl chloride/vinyl acetate) containing 85 percent vinyl chloride and 15 percent vinyl acetate by weight, coated on its external surfaces with a poly(ethylene/acrylic acid) adhesive. A presently preferred material is nylon coated with a poly(ethylene/vinyl acetate) adhesive.

An anode electrode structure comprising a sheet 5a of conductive plastic over which a layer 2a of lithium has been laminated in the manner described above is located principally within the aperture 26 formed in the frame 25 and has external borders extending around and over the aperture 26 (FIG. 4), with the conductive plastic sheet 5a being laminated to the edges of the frame 25 around the borders of the aperture 26 and the conductive plastic sheet 5a being laminated to the conductive primer 24 on the conductive metal end terminal sheet 23 as shown in FIG. 7.

Overlying the anode layer 2a in FIG. 7 is a separator 27 (FIGS. 5 and 7) of any conventional material approximately 2 to 10 mils in thickness. Separators suitable for use in lithium batteries are well known in the art, among those to be considered being polyolefins such as polypropylene, polyethylene, copolymers of propylene and ethylene, mixtures of polyolefins with rubbers such as styrene-butadiene rubber, and the like, together with additives such $TiO_2$ and the like. A suitable microporous polypropylene separator is sold under the trademark Celgard by Celanese Plastics Co. of Greer, S.C. A presently preferred material is a 2 mil microporous polyolefin separator material of the kind described in U.S. Pat. No. 4,287,276, which incorporates a nonionic wetting agent.

Figure 5:
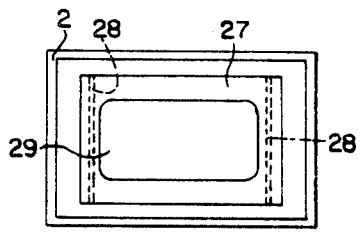
FIG. 5 is a schematic plan sketch similar to FIGS. 2-4, showing a cell in a later stage of manufacture.

The separator 27 is preferably not fully attached along its periphery to the frame 25, but is only selectively adhered thereto, as by means of stripes of adhesive 28 on either side of the separator along two sides thereof, as shown in dotted lines in FIG. 5. The adhesive stripes 28 may be of any selected adhesive material inert to the cell constituents, and for example, of poly(ethylene/vinyl-acetate), a polyamide, or the like. Alternatively, and as presently preferred, where the frames are of the type described above with an external coating of a heat activated adhesive, the separator may be heat-tacked to the frame in discrete regions, as at the corners, to provide sufficient adhesion to carry it through the assembly process.

The components just described, comprising the insulating sheet 20, the metal terminal sheet 23, the frame 25, the conductive plastic layer 5a with its adherent layer 2a of lithium, and the separator 27, are preferably formed in a manner described in copending U.S. application for Letters Patent Ser. No. 295,269, filed on Aug. 24, 1981 by Paul A. Plasse for Laminar Batteries and Methods of Making the Same, assigned to the assignee of this invention and incorporated herein by reference, as a part of a single composite web which acts as an integral subassembly in the process of manufacturing batteries. Overlying the separator in this structure, as seen in FIG. 7, is a cathode 29.

The cathode may be of any conventional composition and construction, but is preferably formed as a slurry of manganese dioxide and carbon particles in an electrolyte solution in an organic solvent containing a lithium salt as the ionically conductive species. Suitable cathode slurry compositions comprise from 50 to 100 parts by weight of propylene carbonate and from 0 to 50 parts by weight of 1,2 dimethoxyethane, based on the weight of solvent, as the organic solvent, with $LiAsF_6$ in concentrations of from 0.05 to 2.00 molal, or $LiClO_4$ in concentrations of from 0.65 to 1.97 molal, as the electrolyte. The electrolyte solution may comprise from 35 to 59 percent by weight, based on the weight of slurry, of a dispersion in the solution of $MnO_2$ and carbon black in weight ratios of $MnO_2$ to carbon of from 8 to 1 to 24 to 1.

Specific cathode slurry compositions that have been successfully employed are given in the following examples:

EXAMPLE 1

| Component | Weight Percent |
| --- | --- |
| $LiClO_4$ | 3.61 |
| Propylene Carbonate | 15.66 |
| 1,2-Dimethoxyethane | 15.66 |
| Carbon | 2.60 |
| $MnO_2$ | 62.46 |
| | 100.0 |

EXAMPLE 2

| Component | Weight Percent |
| --- | --- |
| $LiClO_4$ | 4.61 |
| Propylene Carbonate | 16.56 |
| 1,2-Dimethoxyethane | 16.56 |
| Carbon | 3.69 |
| $MnO_2$ | 58.58 |
| | 100.0 |

EXAMPLE 3

| Component | Weight Percent |
| --- | --- |
| $LiAsF_6$ | 8.98 |
| Propylene Carbonate | 32.01 |
| 1,2-Dimethoxyethane | 13.72 |
| Carbon | 5.03 |
| $MnO_2$ | 40.27 |
| | 100.0 |

EXAMPLE 4

| Component | Weight Percent |
| --- | --- |
| $LiAsF_6$ | 5.70 |
| Propylene Carbonate | 16.37 |
| 1,2-Dimethoxyethane | 16.37 |
| Carbon | 3.65 |
| $MnO_2$ | 57.91 |
| | 100.0 |

EXAMPLE 5

| Component | Weight Percent |
| --- | --- |
| $LiAsF_6$ | 7.94 |
| Propylene Carbonate | 40.00 |
| Carbon | 5.80 |
| $MnO_2$ | 46.26 |
| | 100.0 |

Examples 2 and 4 are presently preferred cathode formulations.

During the preparation of cathode slurries of the compositions given above, the (Kerr-McGee) $MnO_2$ was heated at 375° C. in a furnace for 24 hours under a continuous stream of argon and then stored under vacuum in a glass side arm flask. The $MnO_2$ was redried under vacuum for 6 hours at 160°–170° C., using an oil bath, before introduction into the batteries. The carbon (Cabot XC-72R) was heated to 200° C. for 24 hours in a furnace and then stored under vacuum in a glass side arm flask. The carbon was redried under vacuum at 160–170° C., using an oil bath, for 6 hours before use in batteries. The LiClO₄ was dried under vacuum at 180° C., using an oil bath, for 18 hours and then stored under vacuum in a glass side arm flask. LiAsF₆ which included traces of water as indicated by an infrared spectrum was dried in the same manner; if no water was found, this material was used as received from the manufacturer.

The propylene carbonate was refluxed over molecular sieves with 3Å pores for a period of twenty four hours, and then distilled at 73°–75° C. under a vacuum corresponding to an absolute pressure of about 0.1 torr. It was then degassed by freezing, evacuation and thawing. The degassing procedure would probably be unnecessary in a production environment, using an atmosphere of dry air at atmospheric pressure. The 1,2 dimethoxyethane was also refluxed over molecular sieves for 24 hours, and then distilled at 83°–84° C. at atmospheric pressure Over the cathode 29 is placed a composite end terminal layer comprising, as shown in FIGS. 5, 6 and 7, a sheet of conductive plastic 30, of the same composition as the layer 5a, and for example, of 4 mils in thickness, laminated to a cathode end terminal sheet 31 of metal, preferably of aluminum foil 2 mils in thickness and primed on the side adjacent the conductive plastic layer 30 with a thin coat of conductive plastic adhesive 32 employed for the purpose of adhering the conductive plastic sheet 30 to the metal terminal 31 in a manner known in the art per se and described above.

Figure 6:
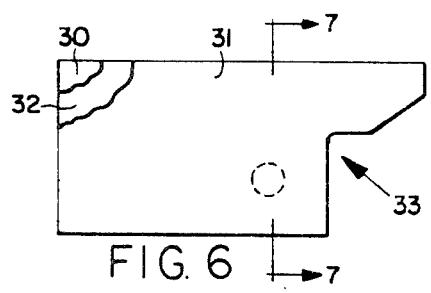
FIG. 6 is a view similar to FIGS. 2-5, showing a cell in a still later stage of manufacture.

As indicated in FIGS. 6 and 7, the end terminal laminate comprising the conductive plastic layer 30, the aluminum sheet 31, and the intermediate conductive plastic priming layer 32 is preferably formed with an extension 33 which is folded around the battery to present a positive terminal on the same side as the negative terminal exposed by the aperture 22. Alternatively, this extension can be omitted, as to facilitate stacking batteries in series to provide a higher operating voltage.

Following assembly, the battery of FIG. 7 may be sealed under vacuum by heat and pressure applied around the edges, in the manner described in the above-cited U.S. application Ser. No. 295,269 except that lower temperatures consistent with the materials employed should be utilized.

Commercially available nominally pure lithium foil normally has a surface coating of $Li_2O$, $Li_2O \cdot CO_2$ or the like, which does not preclude lamination to a conductive plastic substrate of the kind described above. However, it has been found that markedly improved results can be attained if the surface of the lithium that is to be placed in contact with the conductive plastic is freshly exposed, as by cleaning with a razor blade, shortly before the lamination is carried out. The surface of the lithium that is to be in contact with the electrolyte in the assembled cell is not critical in this regard, as it has been found to make no appreciable difference in the electrical performance of the cell whether or not this surface is cleaned.

Integrally packaged laminar multiple cell lithium batteries with reasonable shelf lives cannot be manufactured with a construction analogous to that described in the above-cited U.S. application Ser. No. 295,269. However, in accordance with the invention, such batteries can be manufactured successfully if the construction next to be described in connection with FIG. 8 is employed.

Figure 8:
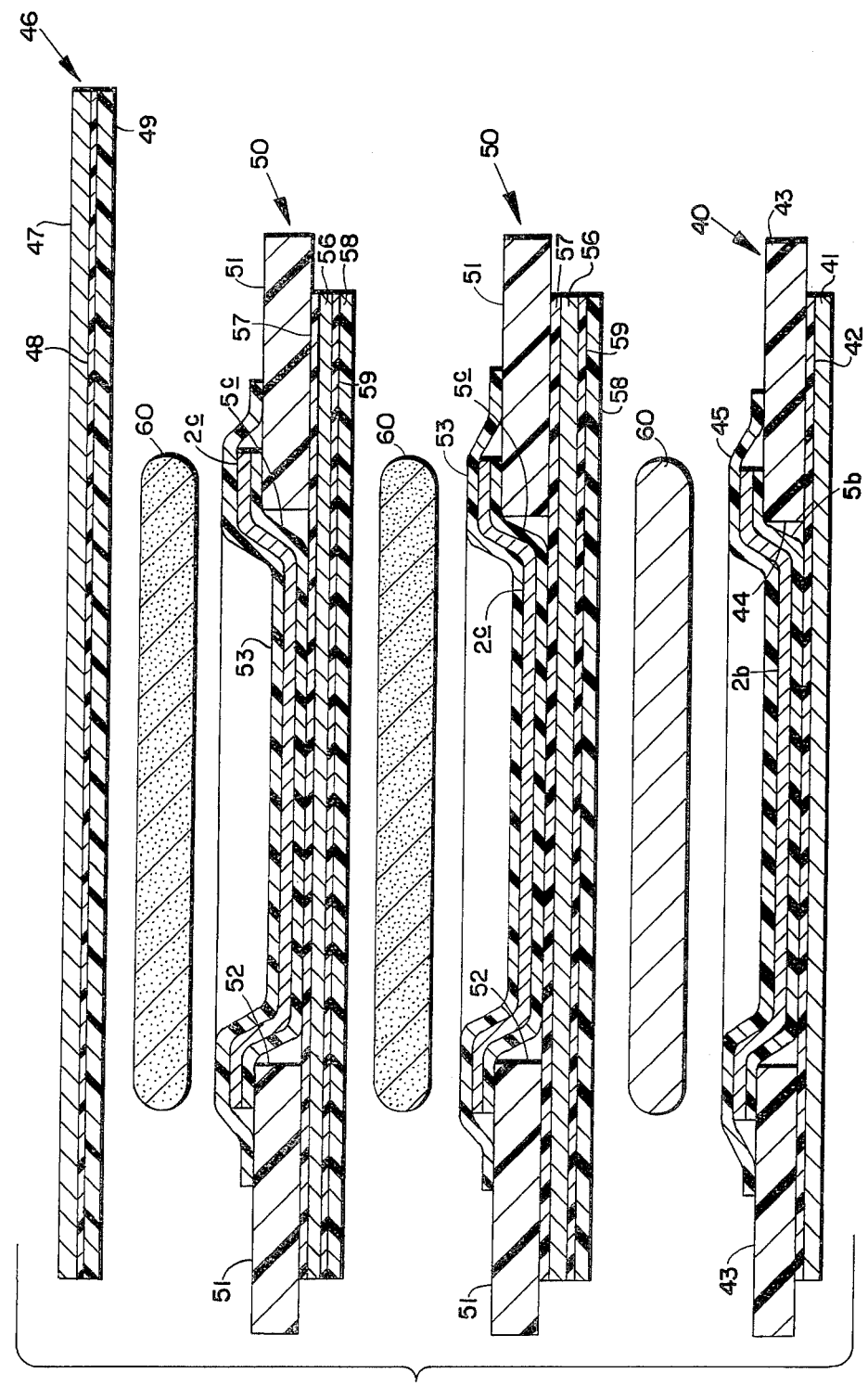
FIG. 8 is an exploded schematic cross-sectional elevational view of a multicell battery in accordance with the invention.

FIG. 8 shows an exploded view of a three cell lithium battery. As will be apparent to those skilled in the art from the following description, this construction is readily adapted to the manufacture of batteries having any number of cells larger than one.

Referring to FIG. 8, the battery may comprise an anode end terminal half cell 40 which is identical with that described above in connection with FIG. 7. Specifically, the anode end terminal collector may comprise a sheet 41 of a suitable conductive metal, such as 2-mil aluminum or the like, coated with a thin layer 42 of a conductive plastic adhesive such as that comprising the layer 24 in FIG. 7.

To the conductive adhesive surface 42 on the aluminum sheet 41 is adhered an insulating frame 43, which may be identical with the frame 25 described above in connection with FIGS. 4 and 7. The frame 43 is formed with a central aperture 44, corresponding to the aperture 26 in the frame 25.

An anode electrode structure comprising a sheet 5b of conductive plastic over which a layer 2b of lithium has been laminated in the manner described above is located principally within the aperture 44 formed in the frame 43 and has external borders extending around and over the aperture 44 (FIG. 8), with the conductive plastic sheet 5b being laminated to the edges of the frame 43 around the borders of the aperture 44 and the conductive plastic sheet 5b being laminated to the conductive primer 42 on the conductive metal end terminal sheet 41, identically as for the corresponding elements described above in connection with FIG. 7.

Overlying the anode layer 2b in FIG. 8 is a separator 45, which may be the same as the separator 27 in FIG. 7. The separator 45 is preferably not fully attached along its periphery to the frame 43, but is only selectively adhered thereto in the manner described above in connection with FIG. 5.

The components of the end terminal half cell assembly 40 just described, comprising the insulating sheet 22, the metal terminal sheet 41, the frame 43, the conductive plastic layer 5b with its adherent layer 2b of lithium, and the separator 45, are preferably adhered to an insulating sheet such as the sheet 22 described above, not shown in FIG. 8, to provide an insulating base for the battery in the manner described above for a single cell battery.

The cathode end terminal 46 of the battery of FIG. 8 is formed as a laminate of metal foil 47, such as aluminum 2 mils in thickness, coated with a thin coat 48 of a conductive plastic adhesive and thereby laminated to a sheet 49 of conductive plastic 49. This laminate corresponds in structure and function to the end terminal layer comprising the metal end terminal sheet 31 primed with conductive plastic adhesive 32 and laminated to the conductive plastic sheet 30 as described above in connection with FIGS. 5, 6 and 7. In the same manner, the end terminal 46 may be provided with a projection 49 at one end to be folded around to the other side of the battery, to present the positive terminal on the same side of the battery as the negative terminal.

Between the anode end terminal half cell subassembly 40 and the end terminal 46 at the cathode end of the battery are n−1 intercell subassemblies 50, where n is the total number of cells in the battery. Each of the intercell subassemblies 50 may be a subassembly such as 40, to which a layer of conductive plastic is adhered for purposes to appear.

That portion of each subassembly 50 which may be identical with the end terminal subassembly 40 comprises a frame 51, which may be identical with the frame 43 and formed with a central aperture 52 corresponding to the aperture 44 in the frame 43; an anode assembly comprising a lithium foil anode 2c laminated to a conductive plastic sheet 5c corresponding in structure and function to the elements 2b and 5a; a separator 53 corresponding to the separator 45; and a solvent barrier layer 56 which may be of any suitable material which is both electrically conductive and essentially impermeable to the nonaqueous solvent included in the cathode slurry, but which in a preferred embodiment comprises a sheet of metal foil, such as 2 mil aluminum foil, identical with the metal terminal sheet 41.

As in the subassembly 40, the sheet 56 is suitably adhered to the frame 51 and to confronting regions of the conductive plastic sheet 5c, as by an intermediate layer of conductive plastic adhesive 57, from 0.1 to 0.8 mils in thickness. As in the corresponding structures previously described, the edges of the conductive plastic sheets 5c are adhered to the borders of the frames 51 around the apertures 52, and the separators 53 are selectively adhered to portions of the frames 51 only in discrete regions.

To each of the solvent barrier sheets 56 is adhered a sheet of conductive plastic 58, as by an intermediate layer 59 of conductive plastic adhesive. These layers 58 and 59 may correspond in structure and composition to the layers 47 and 48 of the end terminal assembly 46; e.g., the layer 58 may be from 3 to 10 mils in thickness, and preferably from 4 to 6 mils, and the layer 59 from 0.1 to 0.8 mils, and preferably about 0.2 mils, in thickness.

The battery of FIG. 8 is completed by cathode slurry deposits 60, which may correspond in amount, dimensions and composition to the cathode 29 in FIG. 7. The battery may be assembled by adhering the metal terminal sheet 41 forming the base of the subassembly 40 to a nonconductive web such as the base sheet 22, 21 in FIG. 7; depositing the first cathode 60 on the separator 45, as by extrusion; next adding in sequence a subassembly 50, cathode 60, another subassembly 50, another cathode 60, and so on until the assembly is terminated by an end terminal 46. The battery is then sealed under vacuum by applying heat and pressure to the edges, to effect a seal between confronting faces of the frames 43 and 51 and the conductive plastic layer 49 of the end terminal 46.

The gross structural difference between a lithium battery constructed as just described in connection with FIG. 8 and a Leclanche battery constructed in accordance with such practices as are described, for example, in the above-cited copending U.S. application Ser. No. 295,269, apart from differences in chemistry, is that in Leclanche structures, the intercell anode assemblies generally corresponding to the assemblies 50 in FIG. 8 lack the solvent barrier layers 56, the layers of conductive plastic adhesive 57 and 59 on both sides of the layers 56, and the conductive plastic sheets 58 of FIG. 8.

In the subassemblies 50 of FIG. 8, the frames 51 perform their normal function of providing an electrically insulating barrier against intercell and intracell shorts, and the conductive plastic layers 5c serve to provide electronically conducting, electrochemically isolating barriers. These elements alone would apparently provide sufficient intercell isolation; however, batteries constructed without the additional barrier layers 56 have been found to develop very high internal impedances. The cause of high impedance in these structures, though perhaps not established beyond peradventure, is speculated to be a relatively subtle permeation of the conductive plastic layers such as 50, in the absence of the barrier layers 56, by organic solvents in the cathode slurry, and particularly by reactive solvents such as propylene carbonate. Such permeation might result in the formation of a highly nonconductive barrier layer; e.g., of $Li_2CO_3$, $Li_2O.CO_2$, or the like; on the lithium anode. The degree of such permeation, if any, is not such as to affect the end terminal assemblies such as 46 in FIG. 8, a finding which is harmonizable with the above assumption either on the theory that there is no appreciable reaction between aluminum and the solvents, or that any reaction products of the interaction between aluminum and solvents such as propylene carbonate would be self-limiting films so thin as to oppose no appreciable barrier to electronic conduction. In any event, the interposition of effective solvent barriers such as 56 has been found to eliminate the high impedance problem.

In the subassemblies 50 in FIG. 8, the solvent barrier 56, which is preferably of aluminum, does not perform simply as a highly conductive current collector, as does the sheet 41; it would be superfluous if that was its only function. Rather, it is to provide an essentially complete barrier against the passage of organic solvent from a cathode in one cell to the anode in the next adjacent cell.

The accompanying layer 58 of conductive plastic is needed to isolate the barrier layer 56 from the adjacent cathode 60, and the conductive plastic layers 57 and 59 simply serve to adhere the various layers together sufficiently to prevent delamination in service, while providing a low resistance to the flow of electrical current.

As more fully described in my copending U.S. application for Letters Patent Ser. No. 340,990, filed concurrently herewith for Hermetically Sealed Lithium Batteries and assigned to the assignee of this invention, which is incorporated herein by reference, the shelf life of lithium batteries with $MnO_2$ cathodes can be considerably enhanced by a partial electrical discharge of the battery during or immediately after electrochemical assembly (i.e., at least within a few hours of ECA), prior to storage, shipment and sale of the batteries. For this purpose, the battery can be connected across a resistor suitable for draining about 20 milliamperes for a time sufficient to remove from 1 to 3 percent of the total capacity of the battery. This practice is preferably followed as a final step in the preparation of batteries in accordance with the invention.

While the invention has been described with respect to the details of specific illustrative embodiments, many changes and variations will become apparent to those skilled in the art upon reading this description, and such can obviously be made without departing from the scope of the invention.

Having thus described the invention, what is claimed is:

1. An intercell assembly for lithium batteries, comprising an electrically insulating frame of thermoplastic material formed with a cental aperture, a thin sheet of aluminum foil coated on both sides with a conductive plastic adhesive and adhered on a rirst side to a first side of said frame in regions surrounding said aperture, a first layer of conductive plastic adhered to said aluminum foil on a second side opposite said first side, a second layer of conductive plastic adhered to said frame on a second side opposite said first side in regions surrounding said aperture and adhered to said aluminum foil in regions within said aperture, and a thin sheet of metallic lithium adhered to said second layer of conductive plastic on a side thereof opposite said aluminum foil.

* * * * *